H. W. SMITH.
METHOD OF MAKING CRAYONS.
APPLICATION FILED APR. 16, 1912.

1,131,433.

Patented Mar. 9, 1915.

Witnesses
H. Strauss
R. H. Krenkel

Inventor
Harry W. Smith
By Joshua R. H. Potts
Attorney

UNITED STATES PATENT OFFICE.

HARRY W. SMITH, OF WEST CHESTER, PENNSYLVANIA.

METHOD OF MAKING CRAYONS.

1,131,433.

Specification of Letters Patent.

Patented Mar. 9, 1915.

Application filed April 16, 1912. Serial No. 691,192.

*To all whom it may concern:*

Be it known that I, HARRY W. SMITH, a citizen of the United States, residing at West Chester, in the county of Chester and State of Pennsylvania, have invented certain new and useful Improvements in Methods of Making Crayons, of which the following is a specification.

My invention relates to improvements in method of making crayons, the object of the invention being to provide an improved method which will increase the output of the factory, which will reduce the number of employees required to a minimum, and will insure a uniform product with the least amount of loss.

A further object is to provide an improved method of manufacturing crayons which simplifies the handling of the material, and reduces breakage of the crayons to the lowest possible percentage.

With these and other objects in view, the invention consists in certain novel steps in the method as will be more fully hereinafter described and pointed out in the claims.

In the accompanying drawings, Figures 1, 2, 3, and 4, illustrate the four principal steps in the carrying out of my improved method.

The composition from which the crayons are made is mixed, and while in a plastic form, is projected from a suitable apparatus illustrated at 1 in the form of a continuous plastic stick 2. To distinguish this continuous supply from the individual sticks, of the crayon, I shall hereinafter refer to the same as the stock.

3, represents a board which is provided with a series of longitudinal grooves to receive the plastic sticks 14, and this board has transverse cuts 7 adjacent its ends for a purpose which will hereinafter appear.

Figure 1:
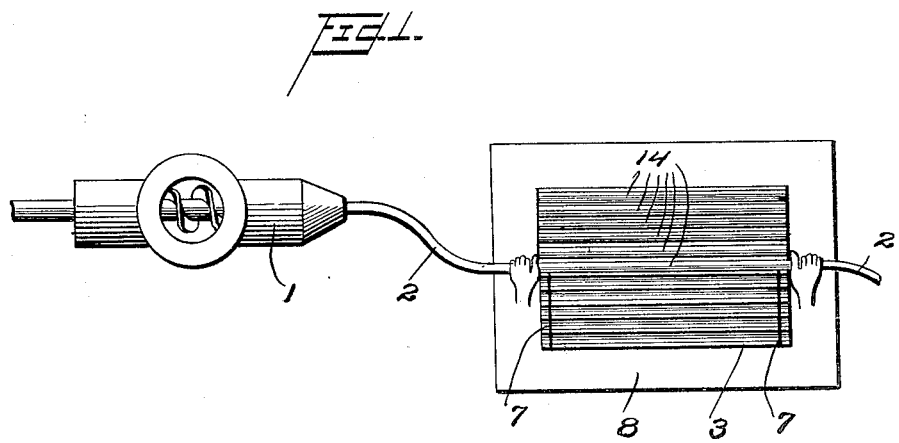
Figure 2:
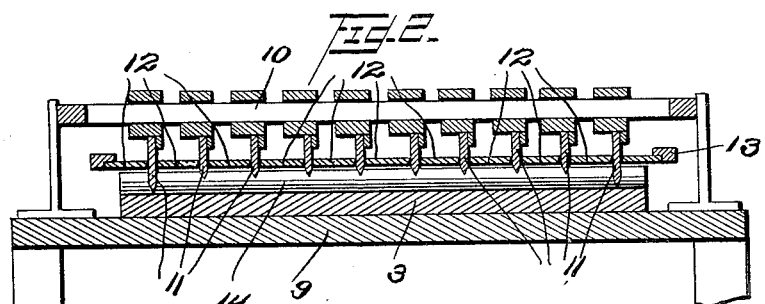
Figure 3:
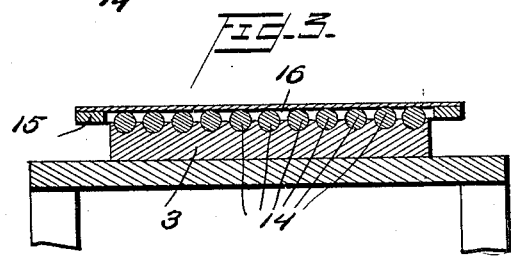
Figure 4:
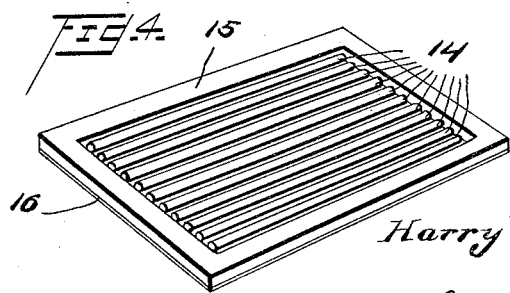

The board 3 is positioned upon a suitable table or other support 8, and the operator stands at one side of the table and grasps the plastic stock as it comes from the apparatus 1. With one hand he directs the stock over the board, and when properly positioned over a groove, he allows the stock to rest in the groove, and by a motion of his thumbs or hands cuts off the plastic stock, leaving one stick in the board. It is to be understood that the plastic stock is continuously feeding so that this operation must be quickly accomplished, and as fast as one stick is placed in a groove, the operator must quickly manipulate his hands to take care of the continuously feeding stock. This, of course, will mean that in one hand there will always be a surplus of stock which the operator throws into a pile, and this material is used over again. By quickly manipulating the hands as the stock comes from the apparatus 1, these sticks may be quickly laid upon the board one after another, and when all of the grooves on the board are full, the board is removed and replaced by a new one. The next step in the method is to place the board 3 on a suitable table 9 beneath a cutter 10. The cutter 10 is designed to be moved vertically and preferably comprises a series of parallel knives 11 which move between slats 12 of a frame 13. This frame 13 is also movable. When the board with its sticks 14 is in position below the frame 13 in the cutter 10, the frame 13 is lowered, so that it lies just above the sticks, and then the cutter is lowered. The end knives 11 project in a lower plane than do the other knives 11, so that these end knives 11 cut entirely through the sticks, the grooves 7 in the board permitting this movement. These end knives, therefore, sever the small ends of the sticks which material is removed and used over. The intermediate knives only nick the sticks. In other words, they cut into the sticks, but partially through the same, preferably less than half through the sticks, but serve to weaken the sticks at these points. The next step in the operation is to remove the board 3 from the cutter, and then place over the sticks a drying tray 15 which consists of a rectangular frame having a canvas or other flexible sheet 16 thereon. This material 16, which I will refer to as canvas, although of course any other material may be used, is positioned directly upon the sticks, and while in this position, the frame 15 and the board 3 are manually inverted, so that the board 3 may be elevated leaving the sticks in the frame as shown in Fig. 4. While in this position, the nicks in the sticks are in the under face of the sticks, and this frame 15 is placed in a suitable drier. After the sticks are thoroughly dried, the frame is removed and by striking the sticks, a light blow, they will break at the nicks leaving a plurality of crayons of the same length.

Having thus described my invention, what I claim as new and desire to secure by Letters Patent is:

1. The herein described method of making crayons consisting in ejecting a continuous stock and manually breaking said stock into lengths with the several lengths located side by side, then drying the sticks, then breaking the sticks into crayon lengths, substantially as described.

2. The herein described method of making crayons consisting in ejecting a continuous stock and breaking with the hands the said stock upon a board, whereby a plurality of similar lengths of said stock are laid side by side on the board, then simultaneously cutting all of said lengths and permitting them to dry, then breaking the sticks at the points where they are cut, substantially as described.

3. The herein described method of making crayons consisting in manually breaking into lengths, a continuously feeding stock, then drying the lengths, then breaking the lengths into crayons, substantially as described.

4. The herein described method of making crayons consisting in laying upon a grooved board a series of parallel plastic sticks manually broken from a continuously feeding stock, then nicking said sticks, then drying said sticks and breaking them at the nicks, substantially as described.

5. The herein described method of making crayons consisting in laying upon a grooved board a series of parallel plastic sticks manually broken from a continuously feeding stock, then nicking said sticks, then positioning a drying frame on the sticks, then inverting the frame and the board, leaving the sticks in the drying frame with the nicks in their lower faces, then drying the sticks, then breaking the sticks at the nicks by light blows on the sticks, substantially as described.

In testimony whereof I have signed my name to this specification in the presence of two subscribing witnesses.

HARRY W. SMITH.

Witnesses:
ARTHUR T. PARKE,
EDITH H. RUSSELL.

Copies of this patent may be obtained for five cents each, by addressing the "Commissioner of Patents, Washington, D. C."